Figures 1, 2:
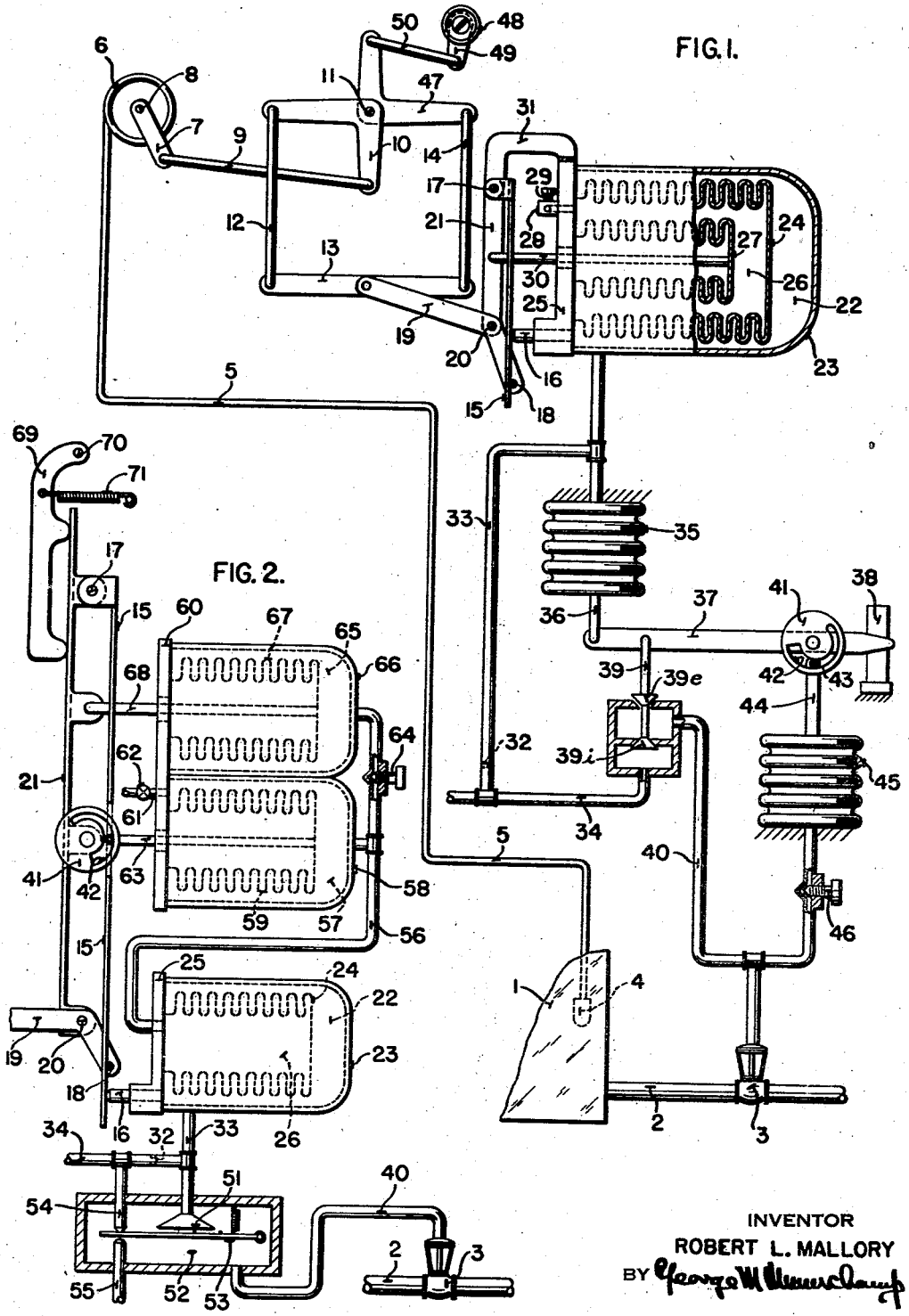

Sept. 29, 1942.  R. L. MALLORY  2,297,361
AIR OPERATED INSTRUMENT
Filed Nov. 9, 1939  3 Sheets—Sheet 1

INVENTOR
ROBERT L. MALLORY
BY
ATTORNEY

Sept. 29, 1942.   R. L. MALLORY   2,297,361
AIR OPERATED INSTRUMENT
Filed Nov. 9, 1939   3 Sheets-Sheet 2

INVENTOR
ROBERT L. MALLORY
BY
ATTORNEY

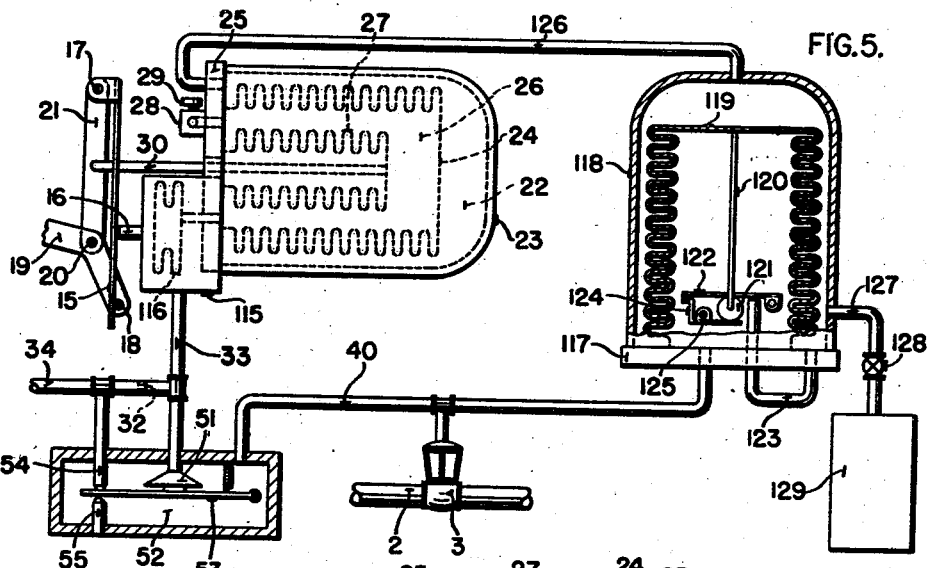

Patented Sept. 29, 1942

2,297,361

UNITED STATES PATENT OFFICE 2,297,361

AIR OPERATED INSTRUMENT

Robert L. Mallory, Houston, Tex., assignor to The Brown Instrument Company, Philadelphia, Pa., a corporation of Pennsylvania Application November 9, 1939, Serial No. 303,553

16 Claims. (Cl. 137—153)

The general object of the present invention is to provide an improved control apparatus of the type comprising an element deflecting in accordance with changes in the value of a controlling quantity or condition, means through which deflection of said element from a predetermined or normal value position of the element varies an air or other control force, and means through which variation in the force thus produced, modifies the action of said element on the first mentioned means so as to effect suitable corrective variations in the control force on a departure of the latter from its predetermined or normal value, without creating an objectionable tendency to unstable control or hunting. While the control condition above mentioned is described herein as temperature it will be understood that it could as well be pressure, humidity, specific gravity, flow or any other condition a change in which may be made to give a movement to some primary measuring element.

More specific objects of the invention are to provide improvements in air actuated controllers so that they will tend to maintain the value of the condition being controlled more nearly at the desired point than those controllers which have heretofore been in use. A further object is to provide a controller which will quickly return the condition to its normal value, upon a departure therefrom, in a minimum amount of time and with a minimum overshooting of the control point.

In the operation of the instrument of this invention a constantly fluctuating pressure is applied to the control valve so that it is in a state of vibration. This vibration is of such small magnitude and/or short period, compared with that of the process, that it will have no effect on the value of the condition being controlled but it will prevent the valve from sticking so that any change in the average pressure applied thereto will be instantly effective.

Of primary importance, however, is that the instrument in each embodiment is so designed that upon a change in the value of the condition a control impulse greater than that necessary to restore the condition to its normal value is applied and then gradually removed as the condition returns to normal. In this manner the change in the condition is quickly checked and it is returned to normal more quickly than would be the case if a smaller corrective force were applied. Such an impulse is known as an "initial effect" and it may be adjusted as desired in accordance with the characteristics of the process that is being controlled.

When controlling, for example, the temperature of a heater and due to an increase in the load thereon the temperature drops, it is necessary to supply more of the heating fluid to bring the temperature back to and keep it at normal. This increased supply may be divided into two portions, first, that necessary to maintain the increased load at the desired temperature and, second, that necessary to return the heater from the low value to which it fell when the load was increased to the normal value. The manner in which the second portion of the supply of heating fluid is fed to the heater determines the time that the temperature will be away from normal, but regardless of how the supply is varied its volume will be approximately the same. Thus if there is a small increase in heating fluid for a fairly long length of time it will have the same effect as a large increase in heating fluid for a short time. In the latter case the temperature will be brought back to normal rapidly and is therefore the most desirable. The instrument of this invention is adapted to make an initially large change in the supply of heating fluid that is proportional to the deviation of the temperature from normal, and then to remove a portion of this large change as the temperature returns toward normal.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention:

In the drawings:

Fig. 1 is a view, partly in section of one form of my invention showing a complete measuring and control system; and Figs. 2 to 6, inclusive, show other forms of the invention, but have omitted therefrom the measuring elements.

Referring to Fig. 1 there is shown a heater 1 whose temperature is to be controlled, and whose temperature may be varied by regulating the flow of a heating medium through a conduit 2 by means of adjustments of a diaphragm valve 3. Located within the heater and responsive to the temperature thereof is a bulb 4 that is filled with a fluid that expands upon an increase in heat. This bulb is connected by means of a capillary tube 5 with the stationary end of a Bourdon tube 6 in the shape of a helix which will unwind upon an increase of pressure therein to move an arm 7 fastened to the movable end of the helix around a shaft 8 upon which it is pivoted. Upon an increase in the temperature of the heater the arm 7 is moved clockwise and through link 9, bell-crank 10, pivoted at 11, and link 12 raises the left end of a lever 13 that is pivoted at its left end on the lower end of a link 14.

Movement of the lever 13 in response to changes in temperature of the heater is used to vary the relative positions of a flapper valve member 15 and an exhaust nozzle 16. The flapper is pivoted at 17 and has a natural bias toward the nozzle, which bias is overcome by movement to the left of a pin 18 on one arm of a bell-crank 19 that has its other arm pivoted to the middle of the lever 13. The bell-crank 19 is pivoted at 20 on the lower end of an arm 21 that is also pivoted at 17.

The nozzle 16 communicates with the interior of a chamber 22 formed between a casing 23 and the exterior of a bellows 24, both of which are attached to a supporting plate 25. A second chamber 26 is formed between the bellows 24 and a second bellows 27 that also has its open end attached to plate 25. The chamber 26 is in restricted communication with the atmosphere by means of a duct 28 that has one end opening into the chamber and which is provided with an adjustable restriction 29. Extending through an opening in the plate 25 is a link 30, one end of which is fastened to the end wall of bellows 27 and the other end of which is attached to arm 21 so that upon a change in length of the bellows the link will be shifted to move arm 21 and the pivot point 20 of bell-crank 19. Also attached to the plate 25 is a support 31 upon which the pivot pin 17 for flapper 15 and arm 21 is mounted.

The chamber 22 and nozzle 16 are supplied with air under pressure through a restriction 32 in a line 33 from an air supply line 34. The line 33 also connects with an expansible bellows 35 so that changes in pressure in the chamber 22 will also be transmitted to the bellows. Upon movement of the flapper 15 as a result of a change in temperature of the heater 1, the flapper will variably throttle the flow through the nozzle 16 and change the pressure in chamber 22. If, for example, the temperature has increased the flapper will be moved away from the nozzle to permit more air to escape therethrough. Contemporaneously therewith the pressure in chamber 22 will be reduced permitting the bellows 24 to elongate, which in turn will increase the volume of and reduce the pressure in chamber 26. Such a reduction will cause an elongation of bellows 27 which will through link 30 move bell-crank 29 and pin 18 to the right to permit flapper 15 to come nearer the nozzle 16, thus permitting a follow-up movement of the flapper.

As the pressure in chamber 26 changes air will flow through the duct 28 and restriction 29 to equalize the pressure in chamber 26 with that of the atmosphere and thus gradually permit bellows 27 to return to its original length to give a compensating movement to the flapper 15. As the bellows 27 resumes its normal length the flapper will again be moved to the left to cancel out the follow-up movement. These pressure changes produce an effect on the valve 3, in a manner to be described below, to close the valve enough to bring the condition back to the normal value. If the temperature of the heater does not change after the bellows 27 has contracted to its normal or unflexed length, the flapper 15 will come to rest with the bell-crank 19 in a position corresponding to a heater temperature slightly higher than would exist in a stable operating condition with a greater demand on the heater for heat.

Pressure to control the opening of valve 3 is supplied through the line 34 to a valve box having suitable valve seats cooperating with intake valve 39i and exhaust valve 39e, both mounted on stem 39. The upper end of valve rod 39 is attached to a lever 37 whose left end is pivoted to a link 36 on the lower end of bellows 35.

The lever 37 has pivoted to it a disc 41 having a slot 42 in it which is of progressively changing width. Extending through this slot is a pin 43 on the end of a member 44 attached to the movable end wall of a bellows 45. This bellows is in communication with the line 40 through an adjustable restriction 46. The right end of lever 37 is in frictional engagement with a brake member 38 with a force normally sufficient to hold that end of lever 37 in its adjusted position. The force is, however, not sufficient to prevent movement of the lever by bellows 45.

With the parts in the position shown air will escape through open valve 39e to reduce the pressure in line 40 and the diaphragm chamber of valve 3 to permit that valve to be moved toward closed position by a suitable spring.

As the pressure is reduced in line 40 air will escape through restriction 46 to shorten bellows 45 and move the pin 43 against the lower edge of slot 42. Continued movement of pin 43 will pivot the lever 37 around link 36 against the force of brake 38 to move valve stem 39 downwardly. This closes exhaust valve 39e and opens intake valve 39i to let pressure built up in line 40, valve 3 and bellows 45 at a rate determined by the opening of restriction 46.

Thus it will be seen that the instrument is continuously raising and lowering the control valve pressure by moving the lever 37 around its pivot on link 36. The magnitude of the pressure fluctuations are determined by the setting of disc 41 since the larger the lost motion between pin 43 and the edges of slot 42 the greater the pressure change that is necessary to change the length of bellows 45 sufficiently to move lever 37. The frequency of the fluctuations is determined by the setting of restriction 46 since the smaller the restriction the longer it will take for pressure to build up in bellows 45.

Any movement of flapper 15 due to a change in temperature of heater 1 will cause a change in the pressure in chamber 22, as was above described. This will also produce a change in pressure in bellows 35 to thereby alter its length. As the bellows 35 changes in length the link 36 will be shifted to raise or lower the left end of lever 37 around its frictionally held right end as a pivot until the lost motion between 42 and 43 is taken up, and then around 43 as a pivot. If the movement of link 39 was up, as a result of an increase in temperature of heater 1, the valve 39e will stay open longer than usual. This requires that the pressure on the valve 3 and in bellows 45 go lower than its previous minimum pressure. Likewise the frequency of the pressure fluctuations on the valve 3 has been decreased by the longer time required for the pin 43 to traverse the slot 42. This provides a lower average valve pressure so that the valve 3 will reduce the supply of heating fluid to the heater 1.

The increased time for the initial pressure fluctuation to take place after a change in length of bellows 35 causes a larger change in the average valve pressure than would be possible without the lost motion. It may be seen further that the faster the rate of departure of the condition from the control point, the greater the effectiveness of this "kick."

In operation, when the condition is at its normal value this instrument will continuously add and subtract an adjustable and controlled excess valve pressure in such a way that the net effect upon the controlled condition is zero. Upon a change in the condition, this positive or negative excess would be increased and permitted to act for a proportionately longer period of time to permit the earliest possible correction for the unbalance of supply and demands of the process, as measured by the bulb 4.

In order to adjust the control point of the instrument or the normal value of the temperature which the instrument maintains it is necessary to change the preliminary adjustment of the flapper 15 with respect to the nozzle 16. This may be accomplished by shifting the link 14 up or down to change the fulcrum point of lever 13. To this end the link 14 is pivoted at its upper end to one arm of a bell-crank 47 that is in turn pivoted at 11. A knob 48 provided with a crank arm 49 is connected to the second arm of bell-crank 47 by a link 50 so that as the knob is rotated the link 14 will be shifted. If it is desired an indicating arm or pen may be attached to it for movement with the bell-crank 10 so that an indication or record of the value of the temperature of the heater is made. Also an arm may be attached to bell-crank 47 so that an indication of the control point will be had. In either case a suitable scale or chart must be provided to cooperate with the indicating arms.

In the embodiment of the invention shown in Fig. 2 the levers for moving the flapper valve 15 in response to changes in the temperature have for the most part been omitted. The operation of the flapper is, however, the same. In this embodiment the pressure in chamber 22 also acts on a diaphragm 51 located within a pilot valve chamber 52. A valve member 53 is biased toward the diaphragm and is moved thereby to restrict either an air supply nozzle 54 or an exhaust nozzle 55. The chamber 52 is connected with the diaphragm chamber of valve 3 by the line 40. In this manner pressure changes in chamber 22 and on the diaphragm 51 move the valve member 53 between nozzles 54 and 55 to maintain a pressure in chamber 52 proportional to that in the chamber 22. This pressure is then applied to the diaphragm of valve 3 through line 40.

Instead of having a second bellows in the casing 23, as was done in Fig. 1, the chamber 26 is connected by a line 56, to a chamber 57 formed by a casing 58 and a bellows 59, both attached at their open ends to a support 60. The chamber 57 is in communication with the atmosphere through a duct 61 having an adjustable restriction 62 in it. A rod 63, attached to the inner closed end of bellows 59 has a bent over end extending into the slot 42 of a disc 41, which is in this case attached to an ear formed on the supporting lever 21.

The line 56, having an adjustable restriction 64 in it beyond the chamber 57 extends to a third chamber 65, formed by a casing 66 and bellows 67 both attached to the support 60. A link 68 extends from the closed inner end of the bellows 67 to an ear on the lever 21, so that the lever will be moved as the bellows changes in length. In this embodiment the lever 21 is resiliently held in a normal position by a lever 69, pivoted at 70 and biased by a spring 71 toward lever 21. Two lugs formed on lever 69 engage the lever 21 on opposite sides of its pivot point 17 and at equal distances therefrom so that upon movement of the lever 21 in either direction the spring 71 will be elongated.

In the operation of this embodiment the pulsating pressure on the valve is obtained in the following manner. If, for example, the flapper has just moved nearer the nozzle 16 pressure will be built up in chamber 22. This will cause bellows 24 to contract and force air through line 56 to chamber 57 to in turn contract the bellows 59. Such movement of that bellows will continue until the link 63 has moved so that its bent over end engages the left edge of slot 42 to move lever 21 clockwise around its pivot and provide a follow-up movement for the flapper 15 to stop the change in air pressure in chamber 22. The pressure increase in line 56 passes slowly through the restriction 64 into the chamber 65. This delay is sufficient so that the follow-up movement of lever 21 has been completed by the time bellows 67 has contracted enough to give a further clockwise movement to lever 21. This through bell-crank 19 and pin 18 moves flapper 15 away from nozzle 16 to permit more air to escape through the nozzle and reduce the pressure in chamber 22.

The reduction in pressure works in a manner opposite to that just described so that bellows 59 will expand and move link 63 to the right, through the lost motion slot 42 to provide the follow-up movement of the flapper 15. The link 68 will then move lever 21 counter-clockwise to again permit the flapper to move toward nozzle 16 and build up pressure in chamber 22 again. The net effect of these pressure variations on the valve 3 is to cancel each other so that an average pressure is maintained thereon in proportion to the value of the temperature.

As a change in the temperature of the heater 1 occurs the bell-crank 19 will be moved relative to the lever 21 and change the relation of the flapper 15 to nozzle 16. The bellows 59 must then move the link 63 further to satisfy the follow-up movement. This causes a longer delay through restriction 64 and an increase above or decrease below the average valve pressure that has been maintained, which pressure is effective for a longer time. From this it may be seen that the valve 3 may be made to oscillate between adjustable limits and with an adjustable and controlled frequency such that an excess over the average valve pressure requirement is immediately available when the temperature of the heater 1 departs from its normal value or control point.

The initial effect or initial increase or decrease in pressure applied to the valve 3 over that which would normally be applied to it is caused in part by the change in pressure necessary to move link 63 through the lost motion, and in part by the pressure increase that is necessary to overcome the force of spring 71. This greater than normal change in pressure will cause the valve 3 to have an increased movement and a greater regulating effect on the passage of heating fluid through it so that the condition can return more quickly to normal.

Figure 3:
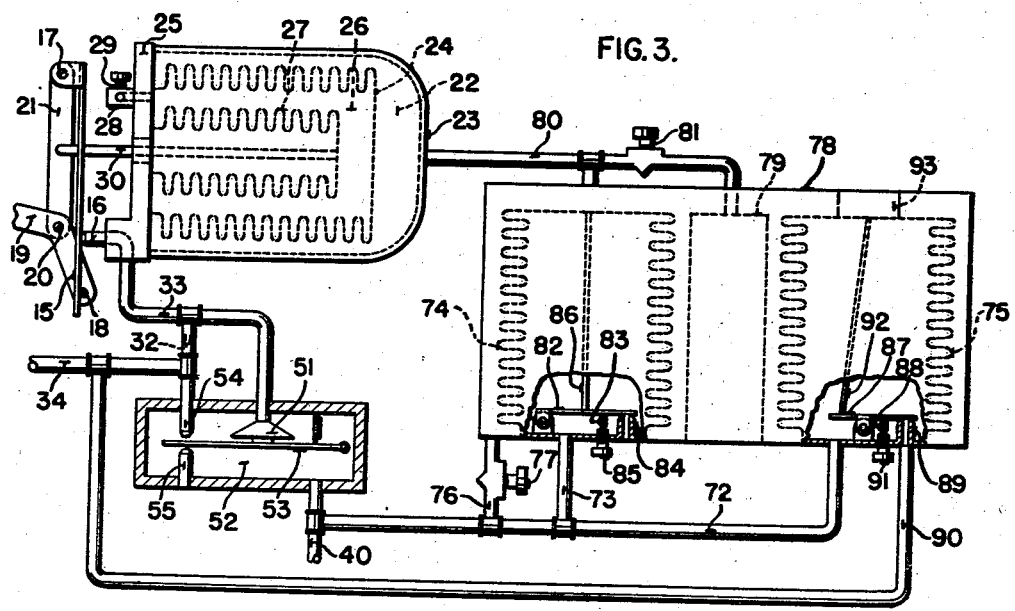

The embodiment of the invention in Fig. 3 differs from that shown in Figs. 1 and 2, in the manner in which the fluctuating pressure is applied to the valve 3. In this embodiment as in those previously described, provision is made to obtain an adjustable initial effect upon the valve as a result of a change in the value of the heater temperature from the control point.

In this embodiment of the invention the nozzle 16 instead of communicating directly with the chamber 22, has the pressure changes, made therein as a result of movement of the flapper 15, applied directly to the diaphragm 51 of a pilot valve of the type shown in Fig. 2. The follow-up and compensating movements of the flapper are furnished in the usual way by the link 30, but the manner in which pressure variations are applied to chamber 22 differ from that previously described.

The valve line 40 has a branch 72 leading therefrom so that a pressure equal to that in the valve is also applied by a branch 73 and the line 72 to the interior of bellows 74 and 75, respectively. Another branch 76 having an adjustable restriction 77 in it leads to a chamber formed within a container 78 that completely surrounds the two bellows and an air volume tank 79 that is so located for convenience. This tank could be made larger if desired and removed from the container 78. The chamber 22 is in communication with the interior of 78 by means of a line 80 and in restricted communication with the interior tank 79 by means of the adjustable restriction 81.

Located within the bellows 74 is a flapper 82 that is biased by a spring 83 to normally cover a nozzle 84 that exhausts to the atmosphere. The spring 83 may be adjusted to apply any desired tension to the flapper by means of a knob or thumb-screw 85. Expansion of the bellows 74 will raise the flapper 82 from the nozzle 84 by means of a link 86 that is fastened at one end to the bellows and at the other end to the flapper.

Located within the bellows 75 is a flapper 87 that is biased by a spring 88 to cover a nozzle 89 that is formed on the end of a line 90 communicating directly with the air supply line 34. The tension of the spring may be adjusted by means of a knob 91. Contraction of the bellows 75 lifts the flapper 87 from the nozzle 89 by means of a link 92 forming a thrust connection between the upper end of the bellows and the left end of the flapper. A stop 93 is provided between the upper end of bellows 75 and the interior of container 78 to limit the maximum length of the bellows.

The fluctuating valve pressure in this embodiment is obtained as follows. Movement of flapper 15 toward nozzle 16 by link 30 will cause pressure to build up on diaphragm 51. This causes an increase in pressure on the valve 3, and, through extension 73, in bellows 74. As the bellows elongates it will overcome the force of spring 83 to open valve 82 to limit the pressure increase. Simultaneously air is leaking past the restriction 77 into casing 78, line 80 and chamber 22. When pressure has built up in there sufficiently link 30 will be moved to the left to move flapper 15 away from nozzle 16, thereby reducing the pressure on diaphragm 51. The pressure will also be reduced on the control valve 3, in line 72, and in bellows 75, to contract the latter. Contraction of 75, through link 92, overcomes the force of spring 88 to open valve 87 and let air direct from the source 34 into the system, thus limiting the reduction of pressure that it is possible to obtain. Simultaneously air is leaking from chamber 22 through line 80 and restriction 77 due to the reduction in pressure in line 40. When the pressure has reduced sufficiently in chamber 22 link 30 will be shifted to the right, moving flapper 15 toward its nozzle to start another cycle.

By the adjustment of the spring 83 any definite increase in valve pressure may be obtained from a decrease in the temperature of the heater. If the restriction 77 is entirely closed this pressure will be maintained until the heater temperature rises to move the flapper 15 away from nozzle 16 since there can be no pressure change in the chamber 22 to provide the follow-up and compensating movements. If, however, the restriction 77 is opened air can leak past it into the casing 78 and line 80 into the chamber 22. Thus the follow-up and compensating movements may take place in a manner previously described at any time after the original valve pressure change by the adjustment of the restriction 77. If the change in temperature was small the restriction 77 will not be as effective as if the change was large because the pressure built up in the chamber 52 and its communication parts will not be so large. Therefore, the action of link 30 on the flapper to remove the initial increase in valve pressure will take place sooner than if the pressure change is large. In this manner the initial effect varies with the magnitude of the temperature change. It will also be obvious that as the temperature of the heater 1 rises due to the change in the valve opening that the pressure in chamber 52 will be reduced and thereby cause the follow-up action to occur sooner than if the temperature did not start to rise.

If it is desired to obtain a longer time delay between the change in valve pressure and the follow-up than is possible by the use of restriction 77 alone the restriction 81 may be opened thus increasing the volume of the system by the volume of tank 79. The amount that the restriction 81 is opened will determine the effectiveness of this increased volume since it determined the rate at which the air may flow to and from the tank.

From the above it will be seen that the magnitude and the length of time that the initial effect is applied to the valve 3 may be varied at will in this form of the invention by changing the tension of springs 83 and 88 and by adjusting restriction 77.

Figure 4:
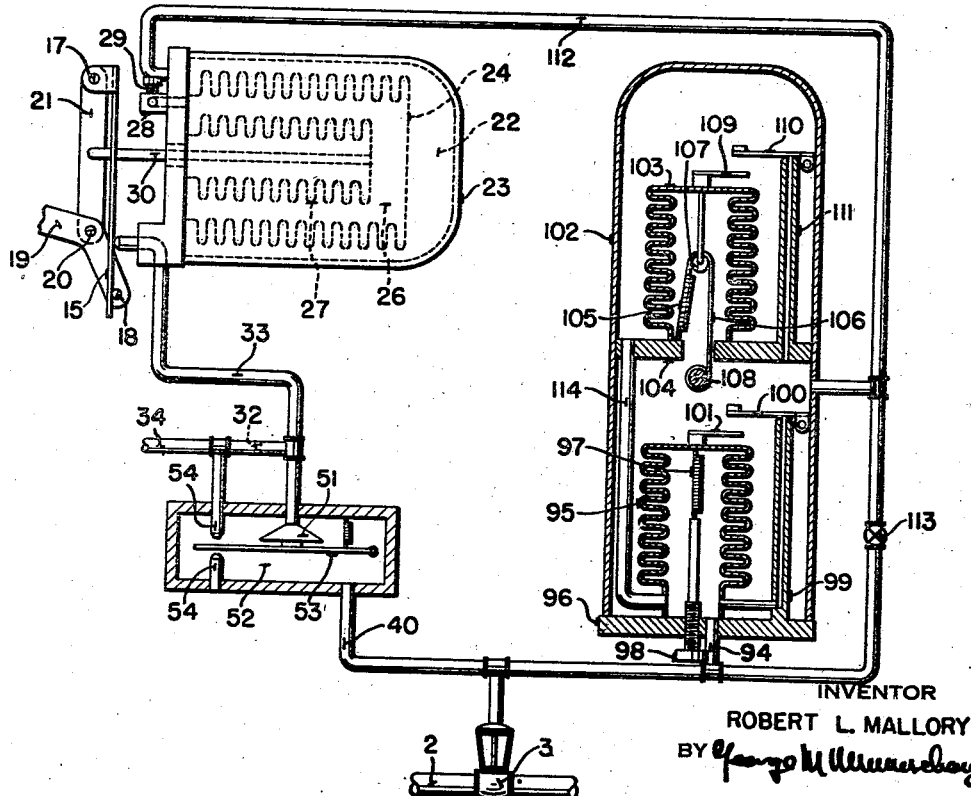

In the embodiment of the invention disclosed in Fig. 4 there is also produced on the valve 3 a fluctuating pressure in addition to the initial effect.

The manner in which the casing 23 and its associated parts and the pilot valve are arranged are the same as the arrangement of those parts in Fig. 3, but the arrangement of the parts that produce the fluctuating pressure on the control valve while the same in principle is different from that previously described. An extension of the line 40 leads through 94 to the interior of a bellows 95 that has its open end attached to a supporting plate 96. The force needed to elongate the bellows 95 may be varied by adjusting the tension of a spring 97 which is attached at one end to the bellows and at the other end to a screw threaded adjusting member 98 that extends through the plate 96. Communicating with the interior of the bellows 95 is a nozzle 99 projecting upwardly from the plate 96, which nozzle is normally closed by a weighted valve member 100. The valve 99 is adapted to be opened by an arm 101 attached to the exterior of the bellows 95, as that bellows expands.

A casing 102 extends upwardly from the plate 96 to cover the bellows 95 and a second bellows 103 that has its open end attached to a partition 104 in the casing. The force necessary to expand bellows 103 may be adjusted by changing the tension on a spring 105 therein, which spring is fastened at one end to the partition 104 and at its other end to a flexible member 106 that passes over a small pulley 107, attached to the bellows end wall, to a rotatable drum 108. This drum may be rotated from the exterior of casing 102 to adjust the spring. Expansion of bellows 103 will, by means of an arm 109 on its end, lift a weighted valve 110 from the end of a nozzle 111 that extends upwardly from the partition 104. The space exterior of the bellows 103 is in communication with the interior of bellows 95 by means of a passage 114. As the pressures within the various compartments in the casing 102 change they are used to change, in a manner to be described, the pressure in chamber 22. To accomplish this a line 112 extends from the chamber 22 to the casing 102, below the partition 104. This line has an extension, containing a variable restriction 113, which connects directly to the valve line 40.

In the operation of this embodiment the fluctuating pressure on the control valve is set up in the following manner. As a result of a movement of the link 30 to the right, for example, the flapper 15 moves nearer nozzle 16 to build up pressure on the diaphragm 51 and thereby move the valve 53 to increase the pressure in chamber 52, line 40 and the control valve. As pressure builds up in line 40 it will also build up in bellows 95 to expand that bellows against the force of spring 97 until arm 101 opens the valve 100. Air can then pass through nozzle 99 and line 112 to chamber 22, building up in that chamber until the bellows 24 and 27 contract, moving link 30 to the left. This will, through parts 21 and 19, move the flapper 15 away from the nozzle 16 to reduce the pressure on diaphragm 51.

Upon a reduction in the pressure on diaphragm 51 air will bleed through the exhaust duct 54 and line 40 from the control valve 3 and from the interior of bellows 95. Air will also bleed through the passage 114 from the space surrounding bellows 103. As the pressure outside of the bellows 103 reduces, that bellows will expand against the tension of spring 105 until the arm 107 lifts valve 110 from nozzle 111. Air will then escape from line 112 and chamber 22 so that bellows 24 and 26 can move link 30 to the right, thus completing a cycle.

Upon a change in the value of the temperature of heater 1 the bell-crank 19 will be moved around 20 to give flapper 15 a movement in addition to that given by lever 21 as it produces the fluctuating pressure on the valve. This will give an excess movement of the flapper in one direction or the other, depending upon the change in temperature, that will cause an increase or decrease in pressure in the bellows 95 in excess of normal to change the setting of the control valve to compensate for the change in temperature.

The amount of the initial increase or decrease in pressure on the control valve depends upon the tension of the springs 97 and 105 and upon the distance that the bellows 95 and 103 have to elongate to lift the valves 100 and 110 respectively.

If it is desired to do away with the fluctuating pressures on the control valve 3 and obtain an immediate follow-up action the restriction 113 may be opened. In this case any change in the valve pressure will be immediately applied through line 40, restriction 113 and line 112 to the chamber 22.

Referring to Fig. 5, there is shown another form of the invention. In this form of the invention the nozzle 16 and line 33 both lead to a small chamber 115 in which is located a bellows 116, the interior of which is in communication with the chamber 26. Because of this construction any change in the position of flapper 15 relative to nozzle 16 will immediately cause a pressure change in chamber 15 to alter the length of bellows 116. This gives an immediate, small follow-up to the link 30 because of the change in pressure in chamber 26 due to the change in length of bellows 116.

A larger follow-up movement which causes the fluctuating pressure on valve 3 is produced by the pressure applied from chamber 52 to the valve line 40 by mechanism now to be described. The line 40 extends through a base member 117 that has attached to it a cup shaped cap 118. Located within the cap and fastened to the base is a bellows 119 that has attached to its closed end a rod 120 on the lower end of which is a roller 121. This roller is adapted, upon elongation of the bellows, to lift a flapper 122 from the end of a small pipe 123 that has its other end opening into the space between the bellows 119 and cap 118. Upon contraction of the bellows the roller 121 bears on the right end of a lever 124, pivoted at 125, so that the left end of the lever will raise flapper 122 from the pipe 123. The space between the cap 118 and bellows 119 is connected by a line 126 to the chamber 22, and by a line 127 having a variable restriction 128 in it, to a volume tank 129.

In the operation of this embodiment as the flapper 15 moves toward the nozzle 16 pressure will build up in chamber 115 and on diaphragm 51 to move valve 53 downwardly to permit a pressure increase in chamber 52. The increase in chamber 115 will compress bellows 116 to increase the pressure in chamber 26 and give a small follow-up movement to rod 30. Contemporaneously therewith pressure will build up in bellows 119 through line 40. This will continue until the natural resilience of the bellows has been overcome and the bellows elongated sufficiently for roller 121 to lift flapper valve 122 from the end of pipe 123. Air can then pass from line 40 through pipe 123, casing 118 and line 126 to chamber 22 to give a larger follow-up movement to the link 30. This movement of the link is sufficient to move flapper 15 away from nozzle 16 and produce pressure changes opposite in direction from those just described to again move flapper 15 toward the nozzle 16.

In this manner a fluctuating or pulsating pressure is continually impressed on the valve 3, which pressure changes average out to have no appreciable effect on the flow through pipe 2. Any change in the condition or temperature of the heater 1 will cause an increased movement of the flapper 15 in one direction or the other to produce a larger pressure change through the line 40 before the mechanism balances out and again starts the normal fluctuations of the valve pressure. In this embodiment the initial effect is produced by the natural resiliency of the bellows 119 and the time it takes the pressure to build up sufficiently therein to lift flapper 122. This may be altered if desired by providing some means for adjusting the tension of the bellows, such as is shown in Fig. 4.

By adjusting the opening of restriction 128 the speed of response of the second, larger follow-up may be changed. This is because with the restriction open the pressure in tank 129 must also be changed with that in chamber 22. The larger the volume the longer the time necessary for the pressure change to take place, and the wider open the restriction 128, the quicker this volume tank can have its pressure changed.

The embodiment of Fig. 6 is similar in some respects to that of Fig. 1 and in others to that of Fig. 5. The supply of air from line 34 in this case passes through a variable restriction 32A instead of the fixed restriction previously described. This restriction could, however, be non-adjustable if desired and the restrictions 32 in the previous embodiments could be made adjustable. Beyond the restriction 32A air passes through line 33 to compartment 115A, similar to but larger than compartment 115, and is permitted to escape through nozzle 16 at rates dependent upon the position of flapper 15. Within the compartment 115A is a fairly large bellows 116A whose interior is connected by pipe 130 to chamber 26. Branching from line 33 is a line that extends to the interior of a chamber 131 formed between a cup-shaped casing 132 and a bellows 133, both of which have their open ends secured to a support 134. This support has an opening in it through which the link 36 extends so that its upper end may be attached to the end wall of bellows 133.

The lower end of link 36 is attached to a lever 37 that adjusts a valve 39 of the type shown in Fig. 1. The lower end of link 44 that supports the projection 43, bearing in the slot 42, is attached to the end-wall of a bellows 135, that with a casing 136 forms a chamber 137. Both the bellows and casing have their open ends attached to a support 138. The valve line 40 is provided with a branch that leads to the chamber 137 so that the valve pressure may be impressed upon the bellows 135. An extension 139 of line 40 leads past a variable restriction 140 to the chamber 22 to provide the large follow-up motion for link 30.

The operation of this embodiment is similar to that of Fig. 1. If the apparatus has moved the lever 21 so that flapper 15 moves nearer to nozzle 16 pressure will build up in chamber 115A to give a small follow-up movement to link 30 and in chamber 131. As pressure builds up in the latter bellows 133 will contract, moving link 36 downwardly, and lever 37 counter-clockwise around its end that is in engagement with friction piece 38. This opens valve 39i and closes valve 39e, permitting pressure to build up in lines 40 and 139. Such pressure increase causes the bellows 135 to contract, move the projection 143 through the slot 142 until its upper edge is engaged, thereby moving lever 37 around 38 as a pivot to partially close valve 39i and open valve 39e. This same pressure change through line 139, at a rate depending upon the adjustment of restriction 140, is applied to chamber 22 to compress bellows 26 and 27 to give a second and larger follow-up movement to link 30. This moves the flapper 15 away from nozzle 16 to reverse the operations just described, whereby a fluctuating pressure is applied to valve 3.

The magnitude of the pulsations is determined by the setting of disc 41 and their duration by the setting of restriction 140, the latter determining the time necessary for pressure to build up sufficiently in chamber 22 to move link 30.

From the above detailed descriptions it will be seen that the instrument of my invention is capable of controlling the value of a condition within narrow limits and is adapted to rapidly bring the condition back to normal upon a deviation therefrom. The ability of the instrument to give an initial effect and the ease with which this effect may be adjusted both as to magnitude and length of duration render it extremely versatile in use.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In an air control instrument, an expansible chamber, valve means to regulate the pressure in said chamber, a pivoted lever, an element pivoted to said lever to adjust said valve upon movement of said lever, means to periodically move said lever around its pivot in such a manner that the valve moves to increase and decrease the pressure in said chamber equal amounts, said means comprising mechanism to vary the time of movement of said lever, and means to adjust the relation of said element and lever in response to variations in a control condition.

2. In an air control unit comprising means responsive to the value of a condition, a chamber, means responsive to the pressure in said chamber to continually vary said pressure a given amount between shiftable limits, mechanism operated by said responsive means to shift said limits in response to variations in the value of said condition.

3. In an air control unit, an expansible chamber, mechanism to continuously vary the pressure a given amount in said chamber between shiftable limits, means responsive to the value of a control condition to change the value of one of said limits and thereby produce an increased pressure change in said chamber and means to vary the size of said increased pressure change for a given change in the value of said condition.

4. In an air control instrument, the combination with an element movable in response to variations in a control condition, regulating means for said condition, means to continually adjust said regulating means through narrow and adjustable limits, means to shift the range of said limits upon movement of said element to thereby vary the average position of said regulating means, and means to delay the operation of said shifting means in proportion to the amount of movement of said element.

5. In a control instrument, an expansible chamber, valve means to adjust the pressure in said chamber, an element responsive to the value of a control condition to move said valve, separate means to periodically adjust said valve within limits determined by its adjustment by the element, means to vary the frequency of said periodic adjustments, and means to vary the amplitude of said periodic adjustments.

6. In a control instrument, a chamber, valve means to regulate the pressure in said chamber, periodically operated means to adjust said valve to cause regularly recurring pressure changes in said chamber, means to adjust the amplitude and frequency of said changes, second means to adjust said valve in response to variations in a control condition, said second and first means acting independently to produce a resultant movement of the valve and pressure change in said chamber larger than that produced by said condition alone.

7. In an air control unit, a control valve adapted to be variably opened in response to changes in a pressure applied thereto, an expansible chamber subjected to the same pressures applied to said valve, means responsive to the pressures in said chamber to continually vary said pressures between given limits, means to delay the pressure change in said chamber until it has acted on said valve and means to vary the limits between which said pressure changes.

8. In an air control instrument the combination with means operable in response to changes in a control condition, a bellows whose length is changed in response to said operations, a lever having one end supported by said bellows, and movable therewith, a pilot valve operated by said lever, a second bellows whose length is changed in response to movements of said pilot valve, a connection between said second bellows and said lever to readjust said lever and pilot valve, and a lost motion device in said connection.

9. In an air control instrument, pressure actuated regulating means, mechanism operative under normal conditions to continuously vary the pressure on said means with a given amplitude and at a given frequency, a chamber, means operative in response to variations in a control condition to change the pressure in said chamber, and means operated thereby to delay the operation of said mechanism whereby the pressure variations applied to said regulating means will be temporarily changed.

10. In an air control instrument an expansible chamber means to apply a pressure to said chamber, means responsive to said pressure to continuously vary said pressure between fixed limits, said means comprising an element adjustable to change the direction of variations at times prior to the attainment of said limits, and means responsive to a control condition to vary the lengths of time determined by said element.

11. In an air control instrument, pressure actuated regulating means, mechanism to apply a continually fluctuating pressure to said regulator comprising a flapper valve, a bleed nozzle, a pressure chamber in communication with said nozzle, means responsive to relative movement of said nozzle and flapper toward each other to increase the pressure on said regulator and to produce relative movement of said nozzle and flapper, means responsive to relative movement of said nozzle and flapper apart to reduce pressure on said regulator and produce reverse movement of said nozzle and flapper, means to vary the amplitude and duration of said relative movement, and means to alter the normal relative movements of said nozzle and flapper in response to variations in a control condition.

12. In an air control instrument, a pressure actuated regulating means, means responsive to the variation of a control condition from a normal value to adjust the pressure on said regulating means comprising an air chamber subjected to the same pressure as said regulating means, valve means to adjust the pressure in said chamber, means to give an immediate follow-up to said valve, means responsive to adjustments of the pressure in said chamber to give a delayed and larger follow-up to said valve and means to alter the normal positions of said valve in response to changes in said condition.

13. In an air control instrument an air space, valve means regulating the pressure in said space, a device for adjusting said valve means in accordance with a control condition, means responsive to changes in said pressure and actuated on a change therein to give said valve an initial adjustment in a reverse direction, means also responsive to said changes in pressure to give said valve means a delayed and larger adjustment in said reverse direction and a subsequent adjustment opposite in direction to said initial and delayed adjustments, said last named means being adjustable to vary the time between said initial and delayed adjustments.

14. In a control system, the combination of an air operated control valve, a supply of pressure fluid to adjust said valve, means operated by said pressure fluid to produce continuous fluctuations in said pressure fluid in opposite directions whereby said valve will be in a continual state of vibration, the average opening of the valve remaining unchanged, means responsive to the value of a condition regulated by said control valve, and mechanism operated by the last mentioned means to adjust said first means to change the average pressure of the fluctuating pressure whereby the average opening of said control valve will be changed.

15. In a control system, a pressure operated control valve, mechanism to apply a continuously fluctuating pressure to said control valve comprising a pilot valve, a supply of air under pressure, means to periodically adjust said pilot valve in opposite directions, said means being operated by said pressure supply, and means responsive to the value of a condition regulated by said control valve to separately adjust said pilot valve and thereby change the operation of said mechanism.

16. In a control system, a pressure operated control valve adapted to regulate the flow of a condition changing fluid, means to supply a continuously fluctuating pressure to said valve including an expansible chamber subjected to the same pressures applied to said valve, means responsive to the pressures in said chamber to continuously vary the pressure therein between given limits whereby said fluctuating pressures are produced, means to delay the pressure change in said chamber until it has acted on said control valve, and means to vary the limits between which said pressure changes responsive to variations in the value of the condition being controlled.

ROBERT L. MALLORY.